United States Patent
Kumar et al.

(10) Patent No.: US 9,434,359 B2
(45) Date of Patent: Sep. 6, 2016

(54) SYSTEM AND METHOD FOR CONTROLLING A BRAKING EFFORT OF A BRAKING SYSTEM IN A POWERED SYSTEM

(75) Inventors: Ajith Kuttannair Kumar, Erie, PA (US); Glenn Robert Shaffer, Erie, PA (US)

(73) Assignee: General Electric Company, Schenectady, NY (US)

(*) Notice: Subject to any disclaimer, the term of this patent is extended or adjusted under 35 U.S.C. 154(b) by 2485 days.

(21) Appl. No.: 12/211,899

(22) Filed: Sep. 17, 2008

(65) Prior Publication Data

US 2010/0070116 A1     Mar. 18, 2010

(51) Int. Cl.
*B60T 7/12* (2006.01)
*B60T 7/18* (2006.01)
*B60T 7/16* (2006.01)

(52) U.S. Cl.
CPC ... *B60T 7/18* (2013.01); *B60T 7/16* (2013.01)

(58) Field of Classification Search
CPC .............. B60T 7/18; B60T 7/16; B60T 7/12; B60T 7/124; B60T 7/126; B60T 7/128; B60T 8/17; B60T 8/1705; B60T 8/171; B60T 8/172; B60T 8/176; B60T 8/1761; B60T 8/17616; B60T 8/1763; B60T 8/17636; B60T 8/17633
USPC .............. 303/3, 7, 15, 16, 17, 20, 22.6, 128; 701/19, 20, 70, 74
See application file for complete search history.

(56) References Cited

U.S. PATENT DOCUMENTS

| | | | | |
|---|---|---|---|---|
| 3,845,991 A * | 11/1974 | Engle | ...................... | B60L 3/108 303/152 |
| 4,414,630 A * | 11/1983 | Harris | ................... | B60T 8/1708 303/166 |
| 4,664,453 A * | 5/1987 | Kade | ................... | B60T 8/17636 303/162 |
| 4,673,225 A * | 6/1987 | Kade | ................... | B60T 8/17636 303/162 |
| 4,750,124 A * | 6/1988 | Lin | ..................... | B60T 8/17636 303/162 |
| 5,147,116 A | 9/1992 | Parker et al. | | |
| 5,392,716 A | 2/1995 | Orschek et al. | | |
| 5,661,378 A * | 8/1997 | Hapeman | .................. | B60L 3/10 318/362 |
| 5,744,707 A * | 4/1998 | Kull | ........................ | G01L 5/284 340/453 |
| 5,992,950 A * | 11/1999 | Kumar | ..................... | B60L 7/22 290/3 |
| 6,401,015 B1 | 6/2002 | Stewart et al. | | |
| 2007/0001629 A1* | 1/2007 | McGarry | .................. | B60L 3/10 318/52 |

* cited by examiner

*Primary Examiner* — Stephen Holwerda
(74) *Attorney, Agent, or Firm* — GE Global Patent Operation

(57) ABSTRACT

A control system is provided for controlling a braking effort of a braking system in a powered system. The powered system travels along a route. The control system includes a controller coupled to the braking system, where the controller is configured to monitor the braking effort of the braking system at a braking region along the route. The controller is further configured to control the braking effort at the braking region, such that the braking effort approaches within a predetermined range of a braking effort threshold, but does not exceed the braking effort threshold. A method is also provided for controlling a braking effort of a braking system in a powered system.

21 Claims, 8 Drawing Sheets

SYSTEM AND METHOD FOR CONTROLLING A BRAKING EFFORT OF A BRAKING SYSTEM IN A POWERED SYSTEM

BACKGROUND OF THE INVENTION

This invention relates to a powered system, such as a train, an off-highway vehicle, a transport vehicle, and an agriculture vehicle, and more particularly to braking systems in such vehicles or other powered systems. Some powered systems (such as, but not limited to, off-highway vehicles, transport vehicles such as transport buses, agricultural vehicles, and trains or other rail vehicle systems) are powered by one or more diesel power units, or diesel-fueled power generating units. With respect to rail vehicle systems, the diesel power unit is typically a diesel internal combustion engine that is a part of a locomotive, with the locomotive(s) being part of a train that further includes a plurality of rail cars, such as freight cars. Usually more than one locomotive is provided, wherein a group of locomotives within a train is commonly referred to as a locomotive "consist." A train may have one or more locomotive consists, or groups of locomotives, separated by one or more train cars, based upon the particular configuration of the train. Locomotives are complex systems with numerous subsystems, with each subsystem being interdependent on other subsystems.

Powered systems, such as a locomotive consist, for example, include various types of braking systems, such as a dynamic braking system, for example. A controller may operate in an automatic mode, in which a motoring output (i.e., motoring power) of an engine is predetermined at incremental locations along a route when the locomotive consist operates in a motoring mode, and in which a braking output (i.e., braking power) of the engine is predetermined at incremental locations along the route when the locomotive consist operates in a braking mode.

Various regulations, including FRA (Federal Railroad Administration) regulations, impose maximum limits on the braking effort of a locomotive consist during a trip along a route. Among other reasons, such regulations are imposed to reduce instances of train derailment due to over braking. A distinct FRA regulation may be imposed for each locomotive consist within a single train, based on one or more characteristics of the particular locomotive consist. Conventional techniques have been proposed to ensure that the braking effort of the locomotive consist does not exceed the FRA regulation. Such a conventional technique involves disconnecting a braking system and/or one or more axles from the braking system of one or more of the locomotives within the locomotive consist prior to the commencement of a trip along the route, such that the maximum braking effort of the remaining connected braking systems within the locomotive consist cannot exceed the FRA regulation. However, the disconnected braking system cannot be reconnected during routine operation of the locomotive consist, and thus such a conventional technique limits a maximum braking effort of the locomotive consist, particularly at high speeds, as the braking effort is inversely proportional to the speed of the locomotive consist. Additionally, if a conventional locomotive consist includes one locomotive having a connected braking system and another locomotive having a disconnected braking system, and the connected braking system suddenly fails to operate, the disconnected braking system on the other locomotive cannot be utilized to provide the lost braking effort. Additionally, if the braking system of the one or more locomotives is not disconnected, the collective braking effort of the locomotive consist may exceed the FRA regulation, particularly at low speeds. Accordingly, substantial drawbacks are encountered irrespective of whether a braking system of the one or more locomotives is disconnected or not disconnected. Additionally, if one or more axles are disconnected from the powered system of the locomotive, this may cause one of several changes to the braking effort of the locomotive, such as reducing the braking effort by the fraction of the disconnected axles (e.g., ⅙), reducing the maximum braking power of the engine, and/or eliminating all of the braking effort of the locomotive, for example, which complicates the determination of how many axles can be disconnected.

Heretofore, the ability to control the braking effort of a locomotive consist such that the braking effort does not exceed a braking effort limit (e.g., as established by an FRA regulation) has not been ascertainable without substantially limiting a maximum available braking effort, thereby sacrificing braking efficiency. Thus, it would be advantageous to provide a system which controls the braking effort of the locomotive consist such that it does not exceed the braking effort limit, while maximizing the braking effort of the locomotive consist, to improve an overall braking efficiency of the locomotive consist.

BRIEF DESCRIPTION OF THE INVENTION

One embodiment of the present invention provides a control system for controlling a braking effort of a braking system in a powered system. The powered system travels along a route. The control system includes a controller coupled to the braking system, where the controller is configured to monitor the braking effort of the braking system at a braking region along the route. The controller is further configured to control the braking effort at the braking region, such that the braking effort approaches within a predetermined range of a braking effort threshold, but does not exceed the braking effort threshold. (By "approaches within," it is meant that the braking effort approaches the braking effort threshold within the predetermined range.)

In another embodiment of the present invention, the controller is configured to compare the braking effort at the braking region with the braking effort threshold. Additionally, the controller is further configured to transmit a signal to a device to annunciate to an operator of the powered system whether the braking effort has approached within a predetermined range of the braking effort threshold and/or exceeded the braking effort threshold.

Another embodiment of the present invention provides a method for controlling a braking effort of a braking system in a powered system. The powered system travels along a route. The method includes monitoring a braking effort of the braking system at a braking region along the route. The method further includes controlling the braking effort at the braking region, such that the braking effort approaches within a predetermined range of the braking effort threshold without exceeding the braking effort threshold.

DETAILED DESCRIPTION

Though exemplary embodiments of the present invention are described with respect to rail vehicles, specifically trains and locomotives having diesel engines, exemplary embodiments of the invention are also applicable for other powered systems, such as but not limited to off-highway vehicles (OHV) and transport vehicles, such as transport buses, for example, each of which may use a diesel or other engine. Towards this end, when discussing a specified mission, this includes a task or requirement to be performed by the powered system. Therefore, with respect to railway, off-highway vehicle, or transport vehicle applications this may refer to the movement of the system from a present location to a destination. An operating condition of the diesel-fueled power generating unit may include one or more of speed, load, fueling value, timing, etc. Off highway vehicles may involve a fleet of vehicles that have a same mission to move along earth, from location A to location B, where each OHV is linked in time to accomplish the mission.

Figure 1:
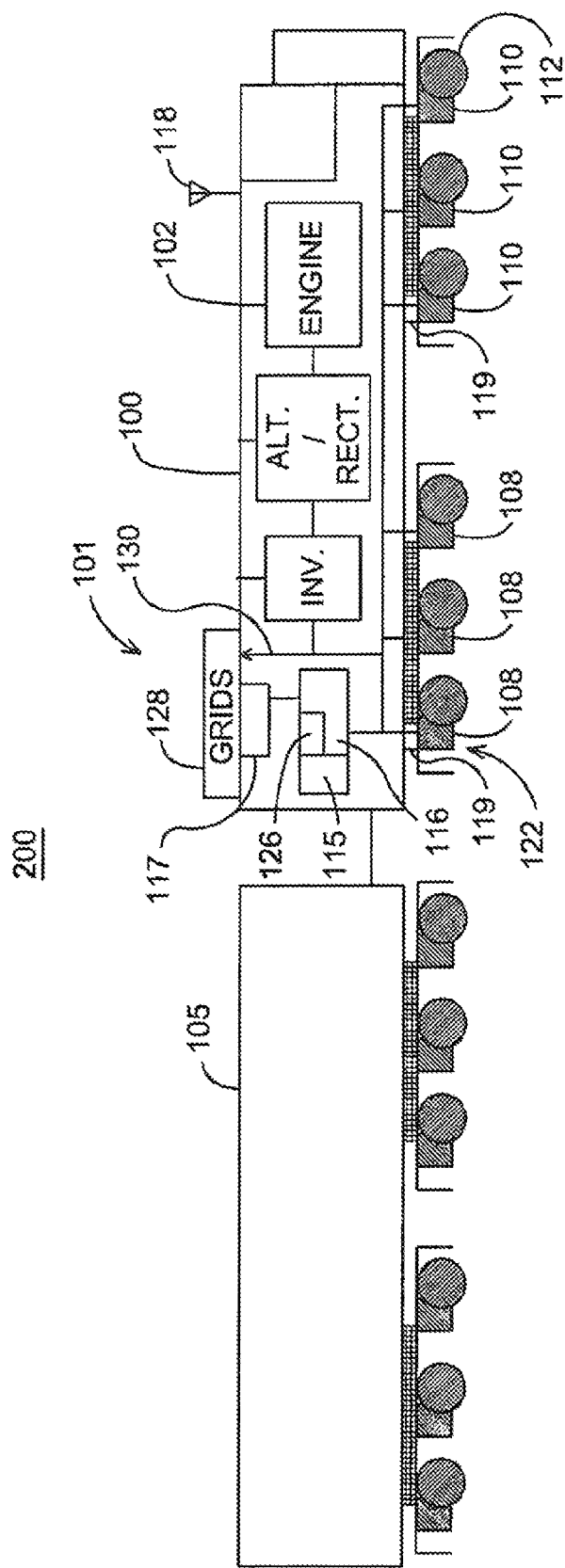
FIG. 1 is an exemplary embodiment of a system for monitoring the effectiveness of a braking function in a powered system in accordance with the present invention.

FIG. 1 illustrates an exemplary embodiment of a system 200 for monitoring the effectiveness of a braking function 122 in a powered system, such as a train 101, for example. As illustrated in the exemplary embodiment of FIG. 1, the train 101 includes a front locomotive 100 and a trailing car 105. The system 200 further includes a plurality of sensors 115, 117, 118, 119 to measure one or more parameters related to the operation of the train 101. As further illustrated in the exemplary embodiment of FIG. 1, the system 200 further includes a processor 116 which is coupled to the sensors 115, 117, 118, 119, in order to receive data of the measured parameters. Upon activating the braking function 122, the processor 116 is configured to determine the effectiveness of the braking function 122 of the train 101 based upon whether the parameter data varies by a predetermined threshold within a predetermined time or a predetermined distance, as discussed in further detail below.

The sensors 115, 117, 118, 119 may measure parameters related to the overall performance of the train 101, such as the speed, acceleration, or total tractive effort of the train 101, for example. As illustrated in the exemplary embodiment of FIG. 1, a speed sensor 115 is provided to measure the speed of the train 101, and to provide speed data to the processor 116. Upon receiving the speed data, the processor 116 may compute the time-derivative of this data, in order to obtain the acceleration data of the train 101. Alternatively, the system 200 may include an acceleration sensor which internally computes the train acceleration data and provides this acceleration data to the processor 116.

Figure 2:
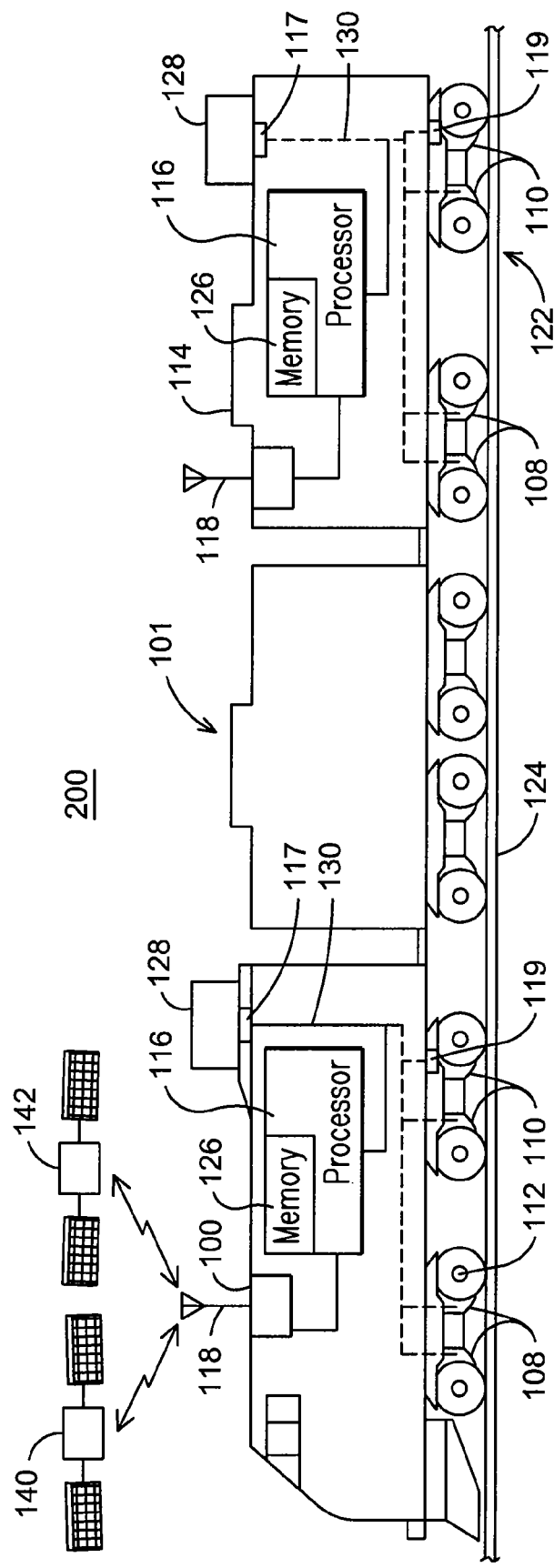
FIG. 2 is an exemplary embodiment of a system for monitoring the effectiveness of a braking function in a powered system in accordance with the present invention.

In an exemplary embodiment, upon activating the braking function 122, the processor 116 is configured to determine the effectiveness of the braking function 122 of the train 101 based upon whether parameter data related to the overall performance of the train 101 varies by a predetermined threshold within a fixed time or a fixed distance. The memory 126 of the processor 116 is configured to store the predetermined threshold to vary a first parameter during a fixed time or a fixed distance from a respective initial value at an initial time or an initial location. The predetermined threshold for variation of the first parameter over the fixed time or the fixed distance is based upon a plurality of secondary parameters at the initial time or initial location. In an example, as discussed above, upon activating the braking function 122, the processor 116 determines the acceleration data from the speed parameter data provided by the speed sensor 115 as the train 101 travels along a track 124 (FIG. 2). A predetermined threshold, such as a minimum deceleration, for example, is stored in the memory 126 of the processor 116 and is compared with the actual acceleration data. The minimum deceleration may be based on an initial value of one or more secondary parameters, such as an ambient temperature, the type of locomotive (AC or DC), physical characteristics of the locomotive, and a topography at the initial time or initial location of the train 101, for example. The processor 116 determines the effectiveness and/or the availability of the braking function 122 based upon whether the actual acceleration data complies with the minimum deceleration stored in the memory 126, for example.

In another example, upon activating the braking function 122, the processor 116 determines a total tractive effort produced by the traction motors 108, 110 based upon electrical current data measured by a sensor 119 such as a current meter positioned to measure a current passing through the traction motors 108,110 upon activation of the braking function 122. A predetermined threshold for the tractive effort, such as a minimum total tractive effort, may be stored in the memory 126 of the processor 116 and is retrieved to be compared with the actual tractive effort based upon the current data. The minimum total tractive effort may be based upon an initial value of one or more secondary parameters at the respective initial time or initial location, for example.

In another example, the sensor 118 may be a position determination device such as a transceiver, which is positioned on the external surface of the locomotive 100 and is configured to be in wireless communication with a plurality of satellites 140, 142 (FIG. 2) such as global positioning system (GPS) satellites, for example, to determine the location of the train 101. The position determination device, such as the transceiver, is coupled to the processor 116, and conveys the location information of the train 101 to the processor 116. A memory 126 of the processor 116 retrieves a track parameter, such as a track position or a topography, for example, of the current location of the train 101 from pre-stored data of the track parameter based on the location information provided by the position determination device. Additionally, the memory 126 of the processor 116 may store a predetermined threshold for varying the current location of the train 101 over the fixed time, which is then compared with the current location information of the train 101.

The sensors 115, 117, 118, 119 may also measure parameters related to the operation of individual components of the train 101, such as a plurality of resistive grids 128 used to dissipate electrical energy passed from the traction motors 108, 110 along a DC traction bus 130 during the braking function 122. In an exemplary embodiment, the sensors which measure parameters related to individual components of the train 101 may measure those parameters which relate to the generation of electrical energy by the traction motors 108, 110 to a DC traction bus 130 and/or the dissipation of the electrical energy delivered from the DC traction bus 130 through the grids 128 during the braking function 122, such as a dynamic braking function, for example. As illustrated in the exemplary embodiment of FIG. 1, a sensor 117 such as a voltmeter, which is coupled to the grids 128 to measure the voltage difference across the grids 128, is also coupled to the processor 116 to communicate this voltage difference data to the processor 116. Additionally, the sensors 115, 117, 118, 119 may measure parameters related to the traction motors 108, 110 which generate electrical energy during the braking function, and transmit this electrical energy to the DC traction bus 130, for example. As illustrated in the exemplary embodiment of FIG. 1, a sensor 119 such as a current meter is coupled to the traction motors 110 and is configured to measure the current passing through the traction motors 110, and is coupled to the processor 116 to communicate this current data to the processor 116.

Upon activating the braking function, the processor 116 is configured to determine the effectiveness of the braking function 122 of the train 101 based upon whether parameter data related to an individual component of the train 101 utilized during the braking function 122 varies by a predetermined threshold within a momentary time period. In an exemplary embodiment, the momentary time period may be less than one second, and the processor 116 may be configured to activate the braking function 122 and evaluate the components discussed above on a random basis, such as for one momentary time period during one long time period. In one example, the processor 116 may be configured to activate the braking function 122 to evaluate the components discussed below for one momentary time period (e.g., less than one second) every thirty minutes, and is further configured to randomly evaluate each component. Such individual components include those discussed above, such as the traction motors 108, 110 which generate electrical energy during the braking function 122 and transmit the electrical energy to the DC traction bus 130, and the grids 128 which receive the electrical energy from the DC traction bus 130 during the braking function 122 and dissipate the electrical energy. However, the embodiments of the present invention are not limited to evaluating parameters in connection with those components discussed above, and may include any component involved in the braking function 122.

In one example, the sensor 117, such as the voltmeter, provides the voltage difference data across the grids 128 during the braking function 122 to the processor 116, as discussed above. Upon activating the braking function 122, the processor 116 is configured to determine the effectiveness of the braking function 122 based upon whether the voltage difference varies by a predetermined threshold within the momentary time period. The predetermined threshold variation of the voltage difference during the momentary time period may be based on an initial value of one or more secondary parameters of components of the train 101, for example.

In another example, the sensor 119, such as the current meter, provides current data passing through the traction motors 108, 110 to the processor 116 during the braking function 122, as discussed above. Upon activating the braking function 122, the processor 116 is configured to determine the effectiveness of the braking function 122 based upon whether the current data varies by a predetermined threshold within the momentary time period. The predetermined threshold variation for the current data during the momentary time period may be based on an initial value of one or more secondary parameters of the components of the train 101, for example.

In another example, a pair of power sensors may be positioned to electrically couple the traction motors 108, 110 to the DC traction bus 130 and the plurality of grids 128 to the DC traction bus 130. Upon activating the braking function 122, the power sensors are configured to measure the electrical power delivered from the traction motors 108, 110 to the DC traction bus 130 within the momentary time period and the power received by the grids 128 from the DC traction bus 130 within the momentary time period. The processor 116 is configured to determine the effectiveness of the braking function 122 based upon the delivered power and the received power, more specifically, whether the delivered power and the received power are greater than a predetermined power stored in the memory 126. The predetermined power may be based on an initial value of secondary parameters of the components of the train 101 prior to initiation of the braking function 122.

FIG. 2 illustrates an additional embodiment of the present invention, including a train 101 having two locomotives 100, 114, where each locomotive 100, 114 has a plurality of traction motors 108, 110 coupled to a respective plurality of wheels 112 of the locomotives 100, 114. The train operator switches the train 101 into an idle mode, in which case the processor 116 of the first locomotive 100 is switched into a motoring mode such that an engine (and other related components) of the first locomotive 100 is responsible for transmitting electrical energy to the traction motors 108, 110 of the first locomotive 100. Also, upon switching the train 101 into the idle mode, the processor 116 of the second locomotive 114 is switched into a braking mode such that the traction motors 108, 110 of the second locomotive 114 transmit electrical energy to the DC traction bus 130 configured to electrically couple the traction motors 108, 110 and the plurality of grids 128 on the second locomotive 114. A pair of sensors 117, 119 is positioned to respectively couple the second locomotive traction motors 108, 110 to the DC traction bus 130 and the plurality of grids 128 to the DC traction bus 130. Upon switching the second locomotive 114 into the braking mode, the sensors 117, 119 are configured to respectively measure the electrical power delivered from the second locomotive traction motors 108, 110 to the DC traction bus 130 and the electrical power received by the grids 128 from the DC traction bus 130. The processor 116 is configured to determine the effectiveness of the braking function 122 based upon the delivered electrical power and the received electrical power.

FIG. 1 illustrates an exemplary embodiment of the present invention, including the locomotive 100 having a plurality of first traction motors 108 and second traction motors 110 coupled to a respective plurality of wheels 112 of the locomotive 100. The train 101 operator switches the train 101 into an idle mode, upon which the processor 116 is configured to switch a first traction motor 108 of the locomotive 100 into a motoring mode such that an engine 102 (and related components) of the locomotive 100 transmit electrical energy to the first traction motor 108. Additionally, the processor 116 is configured to switch a second traction motor 110 of the locomotive 100 into the braking function 122, such as a braking mode, for example, such that the second traction motor 110 transmits electrical energy to the DC traction bus 130 which electrically couples the traction motors 108, 110 and a plurality of grids 128 on the locomotive 100. As discussed above, a respective pair of sensors may be positioned to respectively couple the second traction motor 110 to the DC traction bus 130 and the plurality of grids 128 to the DC traction bus 130. Upon switching the second traction motor 110 into the braking function 122, such as a braking mode, for example, the respective sensor is configured to measure the electrical power delivered from the second traction motor 110 to the DC traction bus 130 and the electrical power received by the grids 128 from the DC traction bus 130. The processor 116 is configured to determine the effectiveness of the braking function 122 based upon the delivered electrical power and the received electrical power.

Figure 3:
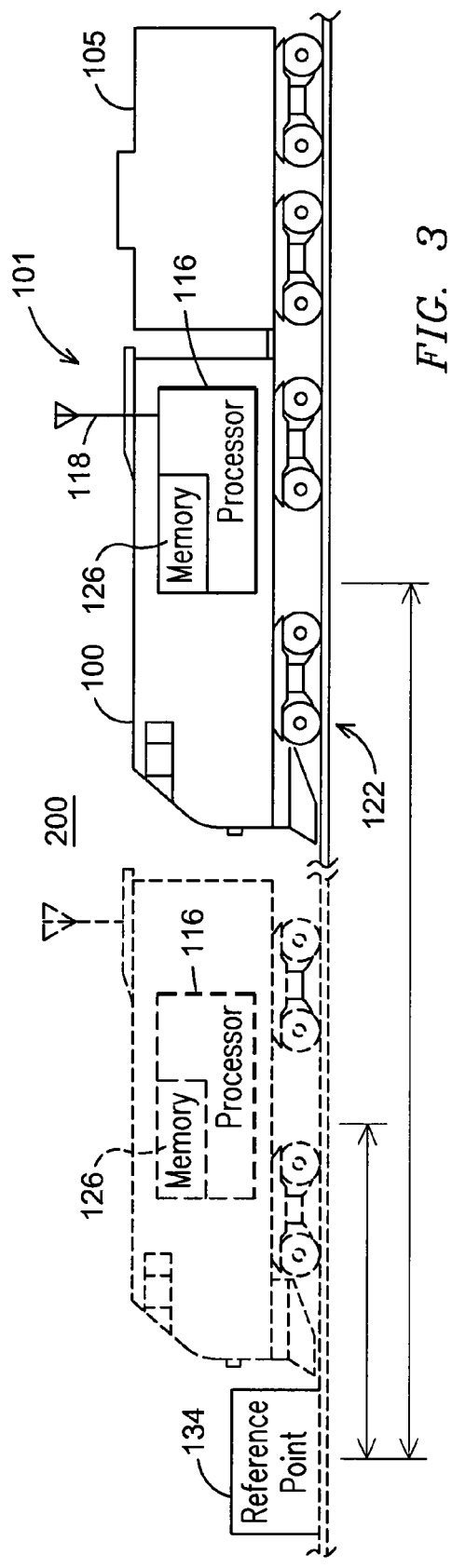
FIG. 3 is an exemplary embodiment of a system for monitoring the effectiveness of a braking function in a powered system in accordance with the present invention.

FIG. 3 illustrates an embodiment of a system 200 of the present invention. As discussed in the embodiments above, the train 101 includes a front locomotive 100 with a processor 116 and the processor 116 is configured to switch into a control enforcement mode to prevent the train 101 from traveling beyond a predetermined location 134 along the track 124. Upon switching into the control enforcement mode, the processor 116 is configured to monitor the effectiveness of the braking function 122, using one of the methods discussed above, as the train 101 approaches the predetermined location 134. The processor 116 is configured to initiate a remedial action upon determining that the effectiveness of the braking function 122 falls below a predetermined acceptable level. For example, the processor 116 may monitor the effectiveness of the braking function 122 by determining whether a parameter of the train 101 is varied by the predetermined threshold within a fixed distance prior to the predetermined location 134, such as whether the acceleration of the train 161 over that fixed distance complies with a minimum deceleration threshold over that fixed distance. The remedial action taken may be activating an alternate braking system, such as an air brake system, for example, activating an alarm to alert the train operator, and/or reconfiguring the braking system.

Figure 4:
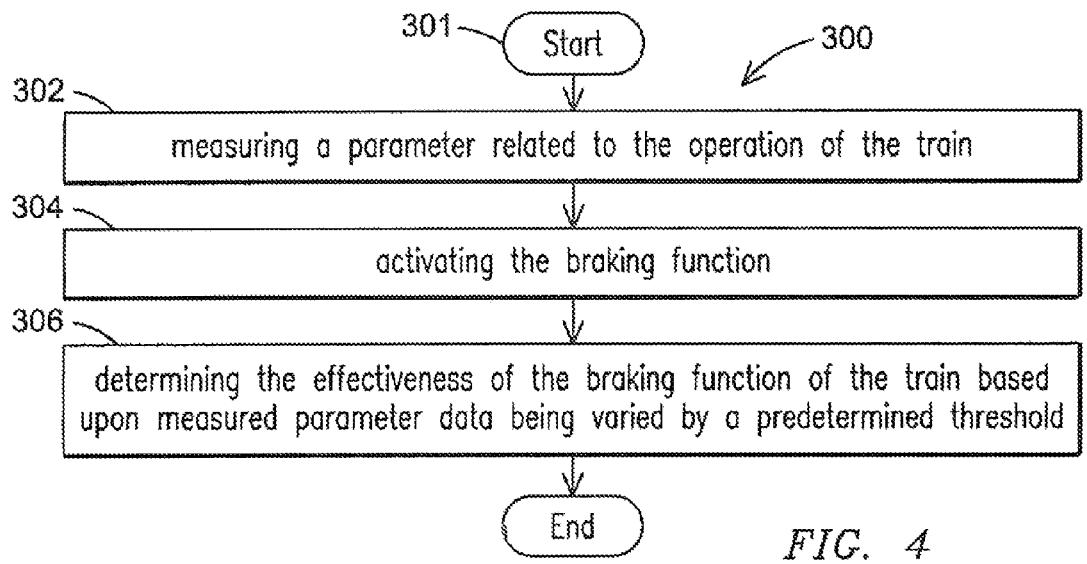
FIG. 4 is a flow chart illustrating an exemplary embodiment of a method for monitoring the effectiveness of braking function in a powered system in accordance with the present invention.

FIG. 4 is a flow chart illustrating an exemplary embodiment of a method 300 for monitoring the effectiveness of a braking function 122 in a powered system, such as a train, for example. The method 300 begins at 301 by measuring 302 a parameter related to the operation of the train 101. Additionally, the method 300 includes activating 304 the braking function 122, followed by determining 306 the effectiveness of the braking function 122 of the train 101 based upon the measured parameter data being varied by a predetermined threshold.

Based on the foregoing specification, the above-discussed embodiments of the invention may be implemented using computer programming or engineering techniques including computer software, firmware, hardware or any combination or subset thereof, wherein the technical effect is to monitor the effectiveness of a braking function in a powered system. Any such resulting program, having computer-readable code means, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system of the method embodiment of the invention. An apparatus for making, using or selling embodiments of the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody those discussed embodiments the invention.

Figure 5:
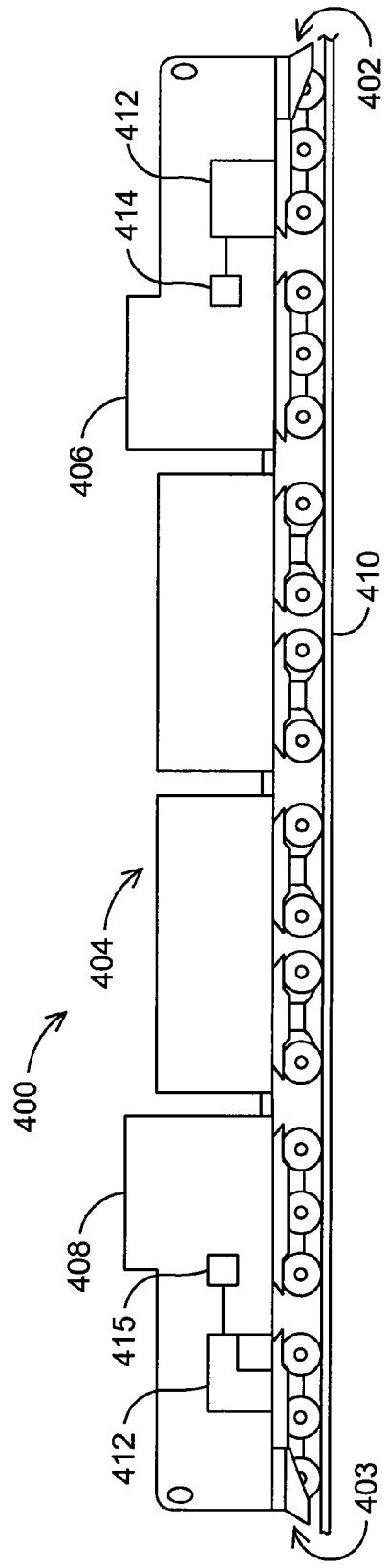
FIG. 5 is a block diagram of an exemplary embodiment of a system for verifying the availability of a high level of a braking system in a locomotive consist.

For those embodiments discussed in FIGS. 5-8, a motoring system of a locomotive will be referred to as an engine of the locomotive. FIG. 5 illustrates a system 400 for verifying the availability of a high level of a braking system 402 in a powered system, such as a locomotive consist 404, for example, including a lead locomotive 406 and a trail locomotive 408, for example. As discussed below and illustrated in FIGS. 5-8, a "high" level of a braking system typically refers to an approximate maximum operating level of the braking system. However, the system 400 may be utilized to verify levels of the braking system below the high level.

Although the embodiments of FIGS. 5-8 discuss the system 400 as applied to a dynamic braking system, the system 400 may be applied to any type of braking system such as an air brake system, used in a powered system, such as a locomotive consist, for example. The locomotive consist 404 travels along a route, such as a railroad 410, for example. A controller 412 is coupled to a respective engine 414, 415 (i.e., motoring system) and the respective braking system 402, 403 of the lead locomotive 406 and the trail locomotive 408. The controller 412 switches between a motoring mode 450 (FIG. 6) to selectively activate a notch of the respective engine 414, 415, and a braking mode 452 (FIG. 6) to selectively activate a level of the respective braking system 402, 403. In an exemplary embodiment, the controller 412 may selectively activate the respective engine 414, 415 between a notch level between 0 and 8, for example. Additionally, in an exemplary embodiment, the controller 412 may selectively activate the respective braking system 402, 403 between a notch level of 0 and 8, for example.

Prior to commencing a trip along the railroad 410, the controller 412 predetermines an activation level 420 of the respective engine 414, 415 and/or an activation level 422 of the respective braking system 402, 403 at incremental locations along the railroad 410. In an exemplary embodiment, the controller 412 may predetermine the activation levels 420, 422 at incrementally-spaced locations of varying separation along the railroad 410, as appreciated by one of ordinary skill in the art, based upon one or more particular trip parameters, including but not limited to: the total distance of the trip, a characteristic of the railroad 410 along the trip (e.g., grade), and a characteristic of the locomotive consist 404 (e.g., horsepower, weight, length, or the like), for example. Accordingly, the spacings of the incremental locations along the railroad 410 may vary from closely-spaced incremental locations (e.g., on the order of feet/yards) to distantly-spaced incremental locations (e.g., miles), based upon particular trip parameters. However, the spacings of the incremental locations along the railroad 410 may be fixed and set by the controller 412. Although the controller 412 may predetermine a high activation level (e.g., notch 8) of the respective braking system 402, 403 at a particular location on the railroad 410, the high activation level of the respective braking system 402, 403 may not be available once that location is reached. Examples of possible reasons for the lack of availability of the high activation level of the respective braking system 402, 403 may be that the traction motors of the braking system 402, 403 cannot produce sufficient current, a number of axles of the locomotive may have failed, the traction motors of the locomotive may have failed completely, and/or a miscalculation of the braking horsepower may have taken place (e.g., 5600 HP instead of 5200 HP). Thus, it would be advantageous to verify the high activation level of the respective braking system 402, 403, particularly at a location at which the high activation level of the respective braking system 402, 403 is not necessary. Accordingly, the system 400 is configured to verify the high activation level of the respective braking system 402, 403 at a location where the predetermined activation level of the braking system 402, 403 is lower than the high activation level. Additionally, the system 400 may be utilized to verify activation levels of the respective braking system 402, 403 lower than the high activation level, provided that this verification takes place at a location where the predetermined activation level of the respective braking system 402, 403 is lower than the activation level being verified. The process by which the controller 412 predetermines the activation level 420 of the respective engine 414, 415 and/or the activation level 422 of the respective braking system 402, 403 at the incremental locations along the railroad 410 is discussed in U.S. patent application Ser. No. 11/385,354/ U.S. Patent Publication No. 2007/0219680A1, which is incorporated by reference herein in its entirety.

Figure 6:
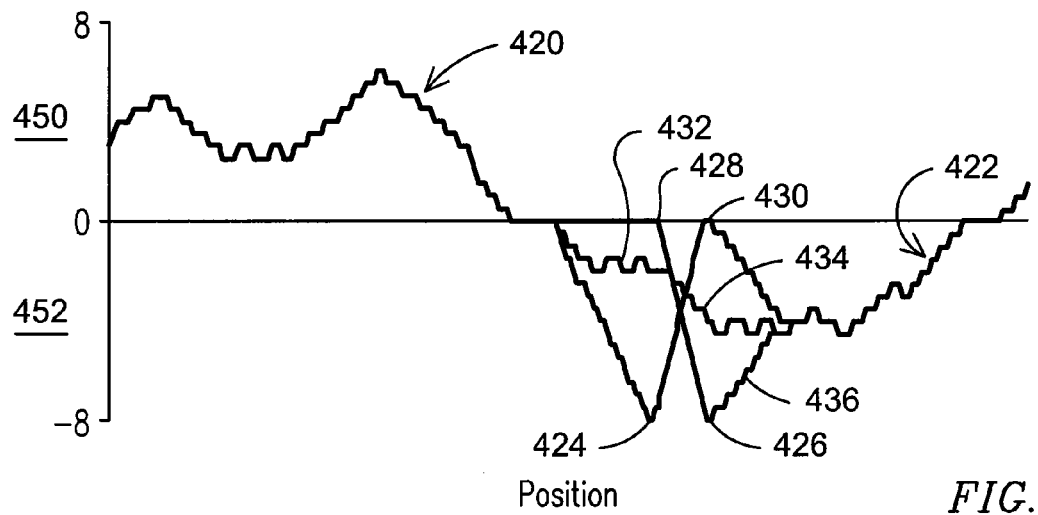
FIG. 6 is a plot of an exemplary embodiment of an activation level of an engine and a braking system to verify the availability of a high level of the braking system.

As illustrated in FIG. 6, when the locomotive consist 404 enters a region in which the controller 412 switches to the braking mode 452, and the predetermined activation level of the respective braking system 402, 403 is low, the controller 412 activates the high activation level 424 of the trail locomotive braking system 403 and simultaneously deactivates the lead locomotive braking system 402 at an incremental location 428. The controller 412 may simultaneously activate the high activation level 424 and deactivate the lead locomotive braking system 402 at the incremental location 428 having a predetermined low activation level 432. The high activation level 424 of the trail locomotive braking system 403 is then verified using one or more methods including: measuring a predetermined deceleration of the locomotive consist 404; measuring a predetermined tractive effort of the trail locomotive 408; or measuring an electrical property of one or more components of the trail locomotive 408, such as a predetermined current of the traction motors, and a voltage difference across the grids, for example.

Subsequent to the incremental location 428, the controller 412 activates the high activation level 426 of the lead locomotive braking system 402 and simultaneously deactivates the trail locomotive braking system 403 at an incremental location 430. Although FIG. 6 illustrates that the controller 412 simultaneously activates the high activation level 426 of the lead locomotive braking system 402 and deactivates the trail locomotive braking system 403, the activation of the high activation level 426 of the lead locomotive braking system 402 and deactivation of the trail locomotive braking system 403 does not need to be performed simultaneously. The controller 412 may simultaneously activate the high activation level 426 and deactivate the trail locomotive braking system 403 at the incremental location 430 having a predetermined low activation level 434. As with the high activation level 424 of the trail locomotive braking system 403 above, the high activation level 426 of the lead locomotive braking system 402 is verified using various methods discussed above. Although FIG. 6 illustrates that the controller 412 activates the high level of the trail or lead locomotive braking system 403, 402, while deactivating the respective lead or trail locomotive braking system 402, 403, the controller 412 may instead activate the high level of the trail or lead locomotive braking system 403, 402, while permitting the respective lead or trail locomotive braking system 402, 403 to remain at the predetermined activation level, for example.

As appreciated by one of skill in the art, the predetermined activation level of the engine 414, 415 and the braking system 402, 403 was respectively the same for the lead locomotive 406 and the trail locomotive 408. At the incremental locations 428, 430, the total of the predetermined low activation level 432, 434 for the braking systems 402, 403 is ideally the same as the total activation level upon activating the high activation level 424, 426 of the trail locomotive 408 and lead locomotive 406, respectively. For example, if the predetermined low activation level 432, 434 was notch 3, which would amount to a total activation level of 6, this would be in the vicinity of the total activation level (8) upon activating the high activation level 424, 426 of the trail locomotive 408 and lead locomotive 406. However, even if the total predetermined activation level of the braking systems 402, 403 at an incremental location does not equal the total activation level of the braking systems 402, 403 upon activating one of the high activation levels 424, 426, the controller 412 may activate one of the high activation levels 424, 426 for a sufficiently short period of time so that the overall impact on the velocity of the train performance is minimal. In one example, the activation of the high activation levels 424, 426 over the sufficiently short time period may be such that a disparity between a total braking level and a total predetermined braking level during the short time period reduce the speed of the locomotive consist by less than a speed threshold compared to a predetermined speed subsequent to the first incremental location.

However, subsequent to the incremental locations 428, 430, the controller 412 adjusts the activation level of the braking systems 402, 403 in an adjustment region 436, such that the speed of the locomotive consist 404 equates with the predetermined speed of the locomotive consist 404, based on the predetermined plan of the controller 412. Additionally, although FIG. 6 illustrates that upon activating the high activation level 424 of the trail locomotive braking system 403 at the incremental location 428, the controller 412 shortly thereafter deactivates the trail locomotive braking system 403 at the incremental location 430, the controller 412 may instead return the lead locomotive braking system 402 and the trail locomotive braking system 403 to the predetermined activation levels after the incremental location 428, for example.

Figure 7:
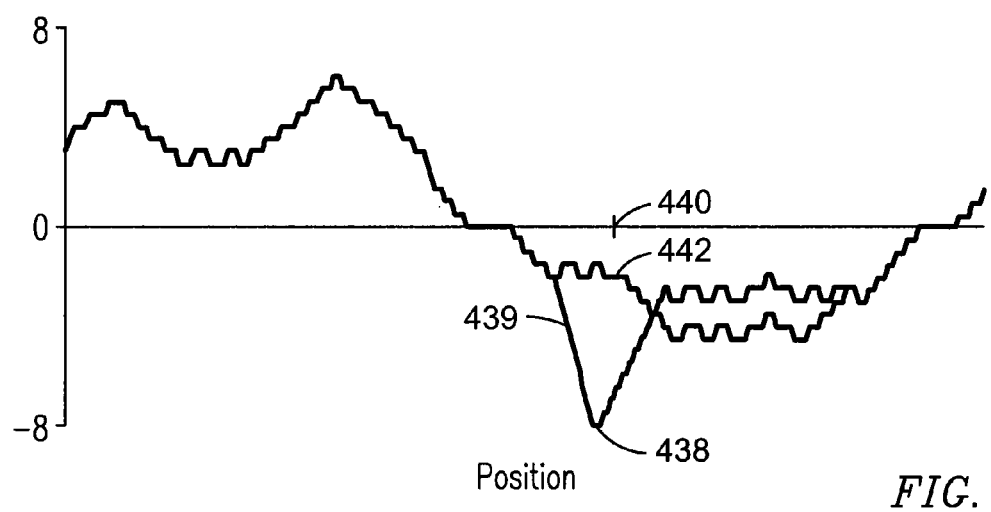
FIG. 7 is a plot of an exemplary embodiment of an activation level of an engine and a braking system to verify the availability of a high level of the braking system.

In another embodiment of the present invention illustrated in FIG. 7, the system 400 may be utilized for verifying the availability of a high level of a braking system 402 in a locomotive 406 traveling along the railroad 410. Similar to the embodiment discussed above in FIG. 6, the controller 412 activates a high level 438 of the braking system 402 at an incremental location 440 which had a predetermined low activation level 442 of the braking system 402. As with the braking system of the lead locomotive 406 and trail locomotive 408 discussed above, upon activating the high level 438 of the braking system 402, the high level 438 is verified using one of the several methods discussed above. As further illustrated in FIG. 7, the activation of the high level 438 of the braking system 402 is not abrupt, but is gradual enough so not to interfere with the handling of the locomotive 406. The gradual increase 439 in the level of the braking system 402 is enacted to ensure that no such interference takes place.

Figure 8:
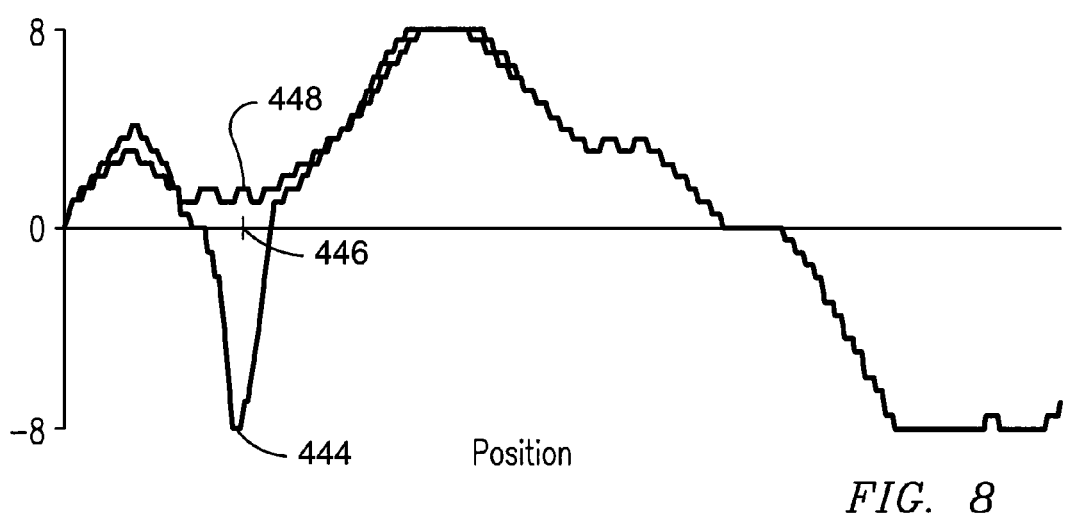
FIG. 8 is a plot of an exemplary embodiment of an activation level of an engine and a braking system to verify the availability of a high level of the braking system.

In an additional embodiment of the present invention illustrated in FIG. 8, the system 400 may be utilized in which the controller 412 activates the high level 444 of the braking system 402 at an incremental location 446 which had a predetermined low activation level 448 of the engine 414 in the motoring mode 450. As with the braking system of the locomotive 406 discussed above, upon activating the high level 444 of the braking system 402, the high level 444 is verified using one of the several methods discussed above. Typically, the high level 444 of the braking system 402 needs only to be verified at one incremental location 446 on the trip prior to a region having a predetermined high activation level of the braking system 402. However, the controller 412 may verify the high level 444 of the braking system 402 on a periodic basis or a random basis, and need not exclusively verify the high level 444 on one occasion prior to a region having a predetermined high activation level of the braking system 402, for example. Additionally, instead of verifying the high level 444 of the braking system 402, the controller 412 may verify the braking system 402 to a maximum predetermined level of the braking system 402 during the predetermined plan, or to a predetermined amount exceeding the maximum predetermined level (e.g., 20%), as calculated by the controller 412, for example. Additionally, the controller 412 may be configured to verify a predetermined activation level of the braking system 402, as the controller 412 activates the braking system 402 to the predetermined activation level, for example. During the verification process of the braking system 402, if a lack of availability and/or failure of the braking system 402 at a high level or a low level is determined, the controller 412 may be configured to re-verify the high level 444 of the braking system 402 using the methods discussed above.

The system 400 as described in FIGS. 5-8 may be enacted by the controller 412 initially assessing the predetermined motoring/braking plan, and determining what locations a high level of the braking system is required. The controller 412 will then analyze the plan to determine a location having a low predetermined level of the braking system, in order to activate and verify the high level of the braking system at that location. In the event that the controller 412 is unable to determine such a location, the controller 412 will then determine a location having a low predetermined level of the engine (i.e., low motoring location), in order to activate and verify the high level of the braking system at that location. The location of low predetermined level of the braking system is generally preferred to activate and verify the high level of the braking system, since activating the high level of the braking system in a location having a low predetermined level of motoring will remove energy from the locomotive, and thus require replacement of this energy, amounting to a less efficient mode.

Figure 9:
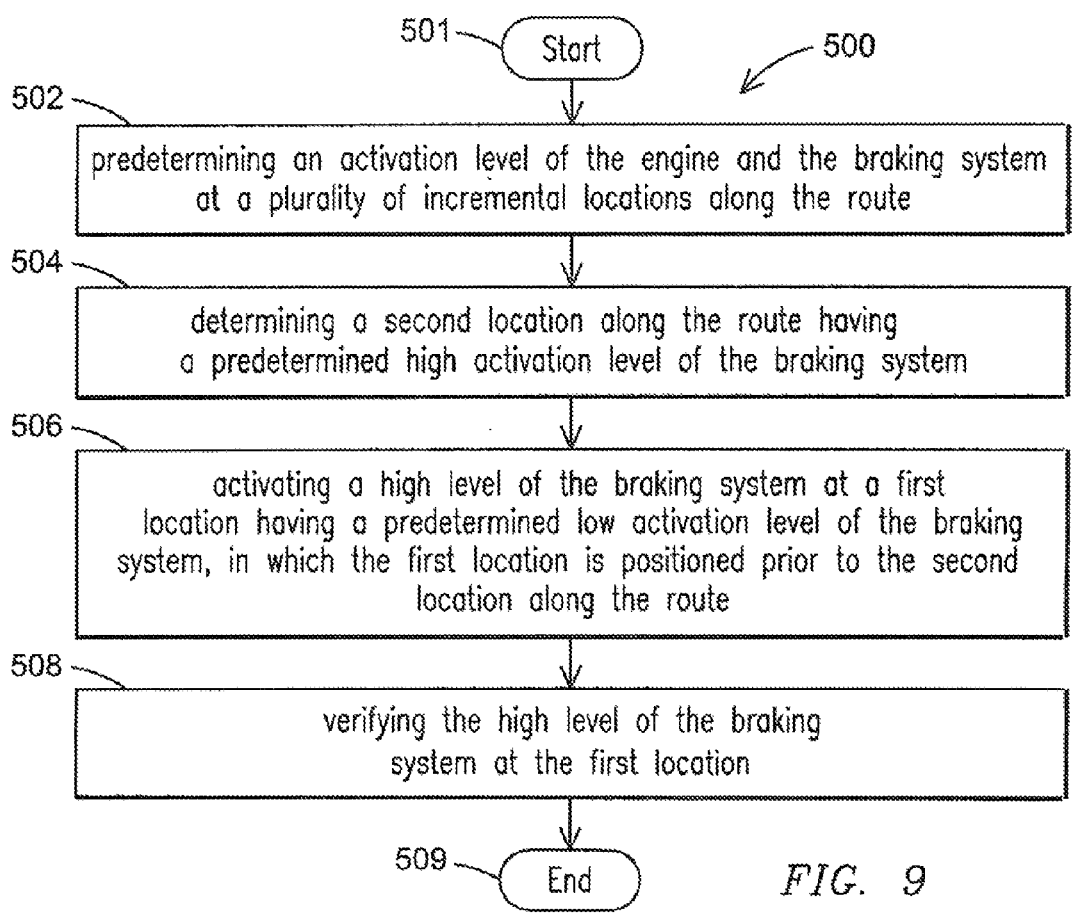
FIG. 9 is a flow chart of an exemplary embodiment of a method for verifying the availability of a high level of a braking system in a locomotive consist.

FIG. 9 illustrates an exemplary embodiment of a method 500 for verifying the availability of a high level of a braking system 402, 403 in a powered system such as a locomotive consist 404, for example. The powered system, such as the locomotive consist 404, includes an engine 414, 415 and the braking system 402, 403. The powered system, such as the locomotive consist 404 travels along a route, such as a railroad, for example. The method 500 begins at 501 by predetermining 502 one of an activation level of the engine 414, 415 and/or an activation level of the braking system 402, 403 at a plurality of incremental locations along the route. The method 500 further includes determining 504 a second location along the route having a predetermined high activation level of the braking system 402, 403. The method 500 further includes activating 506 a high activation level of the braking system 402, 403 at a first location having a predetermined low activation level of the braking system 402, 403. In an exemplary embodiment, the first location is positioned prior to the second location along the route, and the predetermined low activation level of the braking system 402, 403 is lower than the high level of the braking system 402,403 which is to be activated and verified, for example. The first location is positioned prior to the second location along the route. Additionally, the method 500 includes verifying 508 the high level of the braking system 402, 403 at the first location, before ending at 509.

Figure 10:
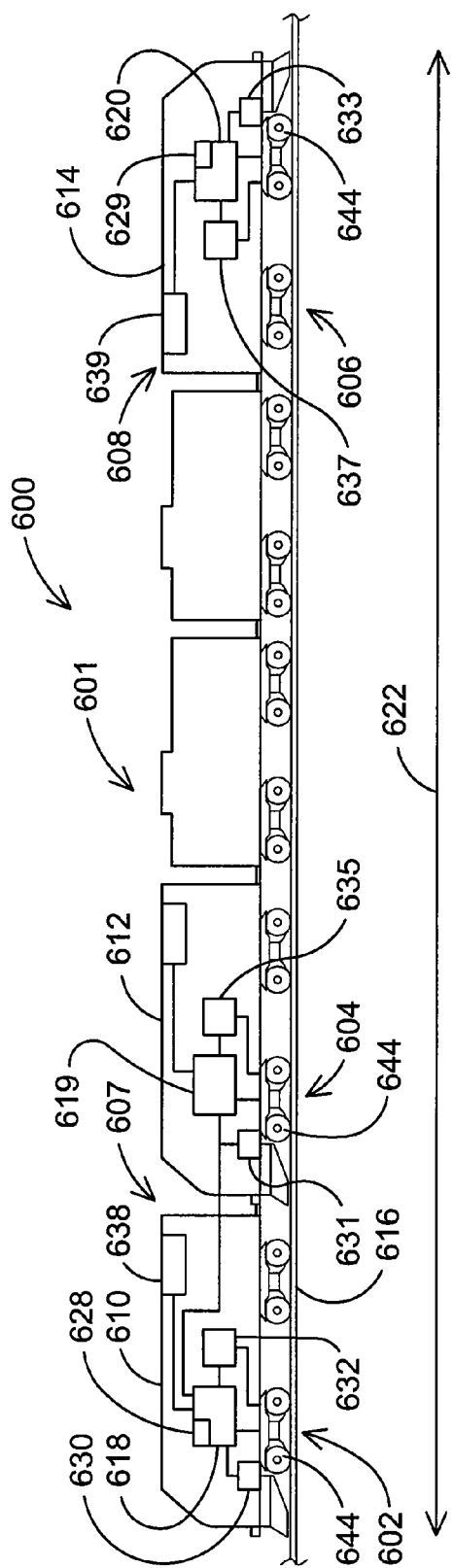
FIG. 10 is an exemplary embodiment of control system for controlling a braking effort of a braking system in a powered system in accordance with the present invention.

FIGS. 10-14 illustrate an exemplary embodiment of a system 600 for controlling a braking effort of a braking system (602,604), (606) in a powered system such as a train 601 having a respective locomotive consist 607,608 including a respective grouping of locomotives (610,612), (614), for example. In an exemplary embodiment, the braking systems (602,604) (606) may be a dynamic braking system, for example. In another exemplary embodiment, the braking system (602,604) (606) may be a combination of a dynamic braking system, friction braking system, and/or air braking system, for example. The powered system, such as the train 601, including the respective locomotive consists 607,608, is configured to travel along a route, such as a railroad 616, for example. Although FIG. 10 illustrates a powered system, such as a train 601, having a front locomotive consist 607 with two locomotives 610,612, and a rear locomotive consist 608 with one locomotive 614, the powered system in accordance with the present invention may be a rail vehicle having any locomotive consist configuration other than the illustrated example in FIG. 10. Accordingly, a powered system in accordance with the present invention may be a rail vehicle having one or more than two locomotive consists, or groupings of locomotives, separated by train cars, and positioned at any location within the train, depending on the particular parameters of the trip along the route. Additionally, although FIG. 10 illustrates a rail vehicle, the powered systems in accordance with the present invention include but are not limited to off-highway vehicles (OHV) and transport vehicles, such as transport buses, for example, each of which may use a diesel or other engine.

As further illustrated in the exemplary embodiment of FIG. 10, a controller 618,620 is positioned on the respective locomotive consist 607,608 and is coupled to the respective braking system (602,604) (606) of the locomotive consist 607,608. The respective controllers 618,620 monitor the braking effort of the braking systems (602,604) (606) at a braking region 622 along the route 616. ("Braking region" refers to a region where a braking system is actuated for applying a braking effort, e.g., a region where a powered system is traveling down a grade, or a region where a powered system encounters a signal or other wayside equipment indicating that the powered system should lower its speed.) Thus, the controller 618 of the front locomotive consist 607 monitors the braking effort of the respective braking systems (602,604) of the locomotives 610,612, while the controller 620 of the rear locomotive consist 608 monitors the braking effort of the respective braking system 606 of the locomotive 614. As illustrated in FIG. 10, the controller 618 is positioned on one locomotive 610 of the locomotive consist 607, and is coupled to the controller 619 of the locomotive 612, such that the controller 618 receives information from the controller 619 of the locomotive 612, in order to monitor the braking effort of the braking systems (602,604) (606). The controller 619 of the locomotive 612 continuously transmits this information regarding the braking effort of the braking system 604 to the controller 618, such as through a trainline cable connection, for example, so that the controller 618 can monitor the braking effort of the braking systems (602,604) of the locomotive consist 607. Thus, the respective controllers 618,620 are designated within the respective locomotive consists 607,608 to monitor the braking effort of the locomotive consists 607,608 as the train 601 moves along the route 616.

In addition to monitoring the braking effort of the respective braking systems (602,604) (606) of the locomotive consists 607,608, the controllers 618,620 control the braking effort of the respective braking systems (602,604) (606) at the braking region 622, as discussed below, such that the braking effort approaches within a predetermined range of a braking effort threshold, but does not exceed the braking effort threshold. Thus, the predetermined range serves as an indicator that the braking effort is approaching within a proximate value of the braking effort threshold. In an exemplary embodiment, the predetermined range may be a fractional ratio of the braking effort threshold, such as 20%, for example. Thus, in the exemplary embodiment, the controllers 618,620 would control the braking effort, such that it approaches within 20% of the braking effort threshold, and does not exceed the braking effort threshold, for example. The respective controllers 618,620 include a memory 628, 629 to store the braking effort threshold and the predetermined range. For example, the memory 628 of the controller 618 may store a braking effort threshold of 100,000 lbs of maximum braking effort for the locomotive consist 607, which cannot be exceeded, and a predetermined range of 20,000 lbs, such that the controller 618 controls the braking effort of the locomotive consist 607 such that it approaches 80,000 lbs (i.e., within the predetermined range of the braking effort threshold), but does not permit the braking effort threshold to exceed the maximum 100,000 lbs limit. Similarly, the memory 629 of the controller 620 may store a braking effort threshold of 60,000 lbs and a predetermined range of 10,000 lbs, for example. The braking effort threshold and the predetermined range for the respective locomotive consist 607,608 may be based upon a characteristic of the route 616, a characteristic of the train 601 including the locomotives 610,612,614 and the load cars (e.g., weight, length, type of car, type of load, or the like), and a characteristic of the respective locomotive consist 607,608, such as, but not limited to, one or more of: a number of locomotives within the locomotive consist 607,608; a maximum horsepower rating of an engine(s) (632,635) (637) of the locomotives (610,612) (614) within the locomotive consist 607,608; a weight of the locomotive consist 607,608; a quantity of traction motors 644 within the locomotive consist 607,608; and/or a length of the locomotive consist 607,608. Each of these respective characteristics of the locomotive consist 607,608 may be stored in the respective memory 628,629, along with the respective braking effort threshold. The braking effort threshold may be established and enforced by the Federal Railroad Administration (FRA), and may be independent of the operating parameters and location of the locomotive consist, for example. In an exemplary embodiment, the braking effort threshold is less than a current braking capacity of the braking systems (602,604) (606), where the braking capacity corresponds to a braking capability of the braking systems (602,604) (606) as the train 601 travels along the railroad 616.

As further illustrated in the exemplary embodiment of FIG. 10, a sensor(s) (630,631) (633) is positioned within the respective locomotive consist 607,608 and is coupled to the respective controller 618,620. The sensors (630,631) (633) measure a parameter related to the operation of the respective locomotive consist 607,608, such as a speed of the locomotive consist 607,608, as it travels along the route 616. Although FIG. 10 illustrates a respective sensor positioned within each locomotive consist 607,608, one speed sensor may be utilized to indicate a common speed of the train 601, and this measured speed from the single speed sensor may be transmitted to the controllers 618,620 positioned within the respective locomotive consist 607,608. The braking effort of the locomotive consist 607,608 during the braking region 622 is based on the measured speed of the locomotive consist 607,608 in the braking region 622. The respective controller 618, 620 controls the braking effort of the respective locomotive consist 607,608 in the braking region 622 based on the measured speed received from the respective sensor 630,631,633. As appreciated by one of skill in the art, the braking effort may be inversely proportional to the speed of the locomotive consist, for example.

The locomotive consists 607,608 further include a respective engine(s) (632,635) (637) which are coupled to the respective controller 618,620. As illustrated in FIG. 10, the engines 632,635 of the locomotives 610,612 within the locomotive consist 607 are both coupled to the controller 618. The engines (632,635) (637) of the locomotive consists 607,608 have an operating characteristic, such as a maximum braking power rating, for example. Thus, in addition to the measured speed received from the respective sensors (630,631) (633), the braking effort of the respective locomotive consist 607,608 is based on the operating characteristic of the respective engine(s) (632,635) (637) of the locomotive consist 607,608. Once the locomotive consists 607,608 have entered the braking region 622, the controllers 618,620 switch into a braking mode and selectively vary the operating characteristic of the respective engine(s) (632, 635) (637), depending on the measured speed data received from the respective sensors (630,631) (633), such that the braking effort at the braking region 622 approaches within the predetermined range of the braking effort threshold and does not exceed the braking effort threshold. In an exemplary embodiment, the braking systems are dynamic braking systems, and upon switching into the braking mode, the selective braking power from the engines causes the traction motors to selectively convert the kinetic energy of the wheels of the locomotive consist into electrical energy, thereby decelerating the locomotive consist, for example.

In addition to the braking effort threshold and predetermined range discussed above, the memory 628,629 of the respective controller 618,620 stores an expected braking effort of the respective locomotive consist 607,608, based upon a respective parameter and a respective operating characteristic of the engine. Once the locomotive consists 607,608 have entered the braking region 622, the respective controller 618,620 monitors the braking effort based on the measured speed received from the sensors (630,631) (633); the operating characteristic (e.g., braking power) of the engine (632,635) (637); and a retrieved expected braking effort from the memory 628,629, based on the measured speed and current operating characteristic. After receiving the expected braking effort from the memory 628,629, the controller 618,620 compares the expected braking effort with the braking effort threshold (also stored in the memory 628,629) to determine whether the braking effort has approached within the predetermined range of and/or exceeded the braking effort threshold. As an example, the memory 628 of the controller 618 may store that, for a speed of 10 miles per hour, and a braking power of 2000 horsepower, an expected braking effort of 110,000 lbs would result. Similarly, the memory 628 of the controller 618 may store that, for a speed of 60 miles per hour, and a braking horsepower of 2000 horsepower, an expected braking effort of 40,000 lbs would result. Thus, the controller 618 may determine that at the speed of 10 miles per hour and braking power of 2000 horsepower, the braking effort of 110,000 lbs exceeds the stored braking effort threshold of 100,000 lbs, for example.

Figure 12:
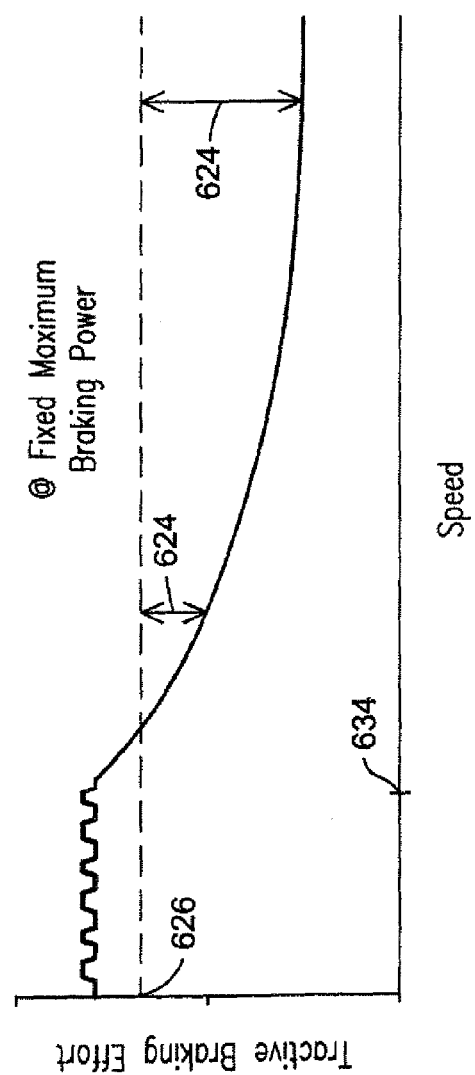
FIG. 12 is a plot of an exemplary embodiment of a braking effort of a braking system in an AC locomotive based on a speed traveling along a route in accordance with the present invention.
Figure 13:
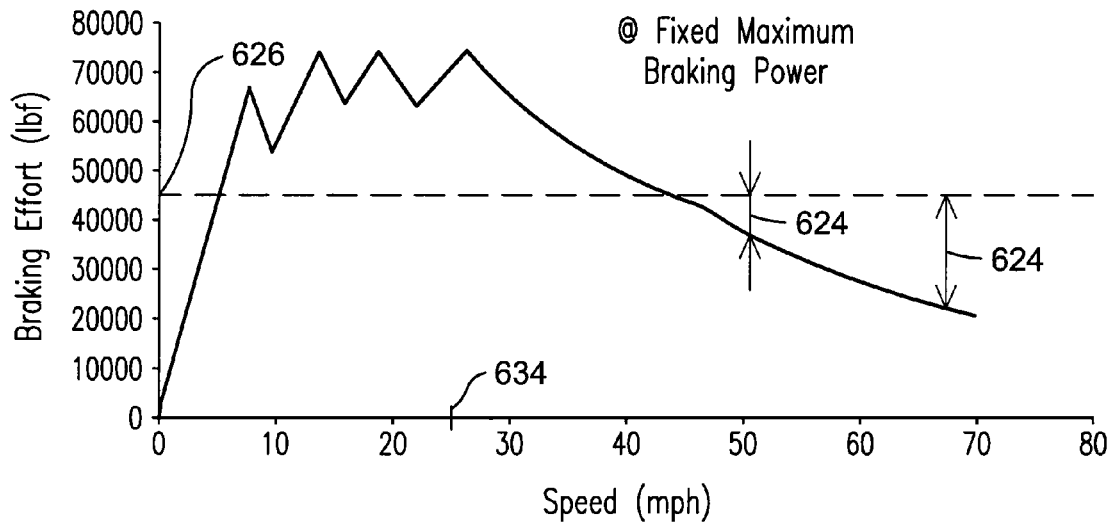
FIG. 13 is a plot of an exemplary embodiment of a tractive braking effort of a braking system in a DC locomotive based on a speed traveling along a route in accordance with the present invention.

As demonstrated in the examples, for a fixed braking power output from the engines (632,635), the locomotive consist 607 produces a braking effort which decreases with increasing speed. FIGS. 12-13 show plots which illustrate the braking effort of the locomotive consist 607 versus the speed of the locomotive consist 607, where the braking power of the engines (632,635) of the locomotive consist 607 is fixed at a maximum level. FIG. 12 illustrates the braking effort of the locomotive consist 607, in which an AC (alternating current) locomotive is utilized within the locomotive consist 607, while FIG. 13 illustrates the braking effort of the locomotive consist 607, in which a DC (direct current) locomotive is utilized within the locomotive consist 607. Although FIGS. 12-13 pertain to the locomotive consist 607, the principles surrounding FIGS. 12-13 are equally applicable to the locomotive consist 608. As illustrated in FIG. 12, the braking effort is substantially uniform for speeds less than a low speed threshold 634, and decreases for speeds greater than the low speed threshold 634. However, as illustrated in FIG. 13, where the locomotive consist 607 includes DC powered locomotives, the braking effort increases to a maximum value, such as 70,000 lbs, for example, for speeds less than a low speed threshold 634. For speeds greater than the low speed threshold (e.g., 25 mph), the braking effort decreases as the speed increases. As shown in FIG. 13, the rate of decrease of the braking effort varies at a second speed (e.g., 45 mph) after the low speed threshold (e.g., 25 mph), and thus the braking effort decreases at a greater rate for speeds greater than this second speed, for example. In an exemplary embodiment, for a locomotive consist, the low speed threshold is in the range of 20-25 miles per hour, for example, but may vary based on the configuration and characteristics of the individual locomotive consist. Additionally, FIGS. 12-13 illustrate the braking effort threshold 626, which is equal for all speeds of operation of the locomotive consist 607, but may vary based on the type of locomotives (e.g., AC versus DC) within the locomotive consist 607. However, the braking effort threshold may vary with the speed of the locomotive consist. In an exemplary embodiment, in addition to being inversely proportional to the speed of the locomotive consist, the braking effort may be directly proportional to the braking power of the engine of the locomotive consist, for example. Based on the exemplary embodiment of FIG. 12, the braking effort of the locomotive consist 607 is greater than the braking effort threshold 626 for speeds lower than the low speed threshold 634, and thus the controller 618 would selectively adjust the braking power of the engines (632,635) to a level below the maximum level in FIG. 12, in order to reduce the braking effort to below the braking effort threshold 626. However, as discussed above in regard to FIG. 13, if the locomotive consist 607 includes DC-powered locomotives, then the controller 618 may maintain the maximum braking power of the engines (632,635), for those speeds below the low speed threshold 634 that correspond to a braking effort lower than the braking effort threshold 626. Also, as shown in FIGS. 12-13, the controller 618 would need to maintain the maximum braking power of the engines (632,635) for those speeds greater than the low speed threshold 634, at which the braking effort is lower than the braking effort threshold 626. As further illustrated in FIGS. 12-13, the predetermined range 624 may vary with the speed of the locomotive consist 607, as the braking effort may only be capable of approaching within varying ranges of the braking effort threshold, regardless of an ideal braking power, for example.

Once the locomotive consists 607,608 enter the braking region 622, the controllers 618,620 monitor the braking effort based on the measured speed received from the sensors (630,631) (633), the operating characteristic (e.g., braking power) of the engines (632,635) (637), and the expected braking effort retrieved from the memory 628,629, based on the respective measured speed and received operating characteristic. In addition to the data discussed above, the memory 628,629 stores the respective low speed threshold of the locomotive consist 607,608. As discussed above with regard to FIG. 12, where the locomotive consists 607,608 include AC-powered locomotives, the braking effort of the braking systems (602,604) (606) in the locomotive consists 607,608 is based on the measured speed, provided that the measured speed exceeds the low speed threshold. For those speeds of the locomotive consist 607, 608 which are below the low speed threshold, the braking effort is based on the operating characteristic (e.g., braking power) of the engines (632,635) (637), and thus the expected braking effort stored in the memory 628,629 for speeds lower than the low speed threshold are based on the operating characteristic (e.g., braking power) of the engines (632,635) (637).

The monitoring of the braking effort by the controllers 618, 620 is discussed above. Upon monitoring the braking effort, the controller 618,620 controls the braking effort, such that the braking effort approaches within the predetermined range of the braking effort threshold without exceeding the braking effort threshold. The memory 628,629 has a pre-stored recommended braking power of the respective engines (632,635) (637), based on a respective speed of the locomotive consist 607,608, such that the braking effort of the locomotive consist 607,608, traveling at the respective speed and with the recommended braking power, will approach within the predetermined range of the braking effort threshold, without exceeding the braking effort threshold. The pre-stored recommended braking power of the respective engines (632,635) (637) may also be based on one or more characteristics of the locomotive consist 607,608, which are also stored in the memory 628,629, and include one or more of: a number of locomotives within the locomotive consist; a number of traction motors within the locomotive consist; a power rating of the engines within the locomotive consist; a weight of the locomotive consist; and/or a length of the locomotive consist, for example. Thus, the controller 618,620 receives the measured speed from the sensors (630,631) (633), and retrieves the recommended braking power from the memory 628,629, which indicates to the controller 618,620 how to selectively vary the operating characteristic (e.g., braking power) of the engines (632,635) (637) such that the braking effort approaches within the predetermined range of the braking effort threshold without exceeding the braking effort threshold.

As further illustrated in the exemplary embodiment of FIG. 10, the system 600 includes a position determination device 638,639 coupled to the respective controller 618,620. The position determination device 638,639 provides location information of the locomotive consists 607,608 along the route 616, such as by communicating with one or more global positioning system (GPS) satellites (not shown), for example. Based on the received location information, the controller 618,620 may retrieve position information of the locomotive consist 607,608 along the route 616, from a look-up table in the respective memory 628,629. Additionally, the position determination device may be any device which is capable of providing location information of the locomotive consist 607,608 along the route 616, such as a speed sensor and a clock, which determine a distance traveled from a known location along the route 616, for example.

The controller 618, 620 predetermines a braking power of the respective engine(s) (632,635) (637) in the locomotive consist 607,608 at incremental locations along the route 616 prior to a commencement of a trip along the route 616. As discussed above, the controller 618 of the locomotive 610 is coupled to the controller 619 of the locomotive 612, and the controller 618 may transmit the predetermined braking power to the controller 619, and subsequently controls the braking power of the engine 635 of the locomotive 612 through the controller 619, for example. This predetermination of the braking power is configured to optimize a performance characteristic of the locomotive consists 607, 608 during the trip along the route 616, such as by maximizing fuel efficiency, for example. The process by which the respective controllers 618,620 predetermine the braking power of the respective engines (632,635) (637) at the incremental locations along the route 616 is discussed in U.S. patent application Ser. No. 11/385,354/U.S. Patent Publication No. 2007/0219680A1, which is incorporated by reference herein in its entirety.

Figure 11:
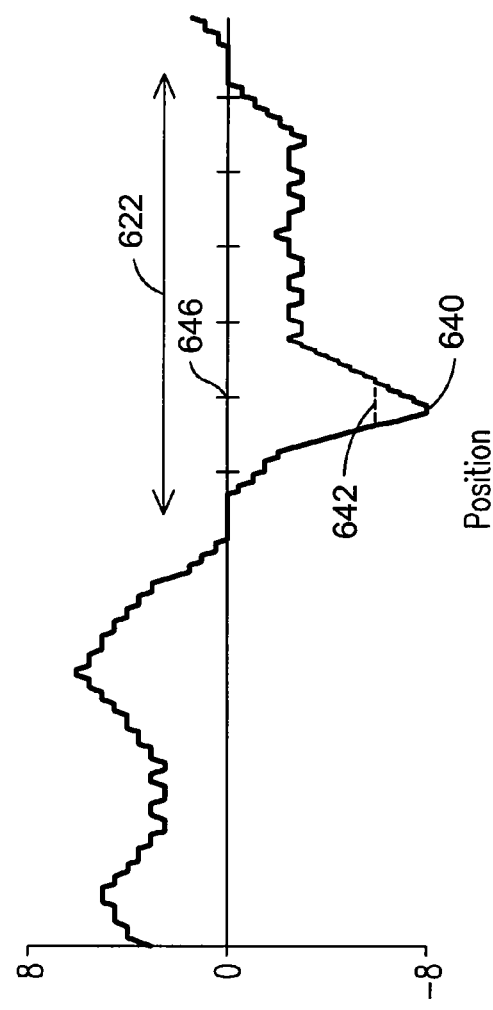
FIG. 11 is a plot of an exemplary embodiment of a predetermined braking power of an engine in a powered system traveling along a route in accordance with the present invention.

As the locomotive consists 607,608 travel along the route 616, the controllers 618,620 are configured to receive the location information from the respective position determination device 638,639. Additionally, the memory 628,629 of the respective controllers 618,620 store the location of the braking region 622. Although FIG. 10 illustrates one braking region, multiple braking regions may be present throughout a trip along the route 616. Based on this received location information, as illustrated in FIG. 11, once the locomotive consist 607, enter an incremental location 646 corresponding to a braking region 622 along the route 616, the controller 618 limits the predetermined braking power 640 to the stored recommended braking power 642 retrieved from the memory 628. As appreciated by one of skill in the art, the braking power of the locomotive engines (632,635) may be adjusted in integral increments from 1 to 8 (i.e. notches). In the exemplary embodiment of FIG. 11, at the incremental location 646 where the predetermined braking power 640 is a maximum braking power (i.e. notch 8) of the engines (632,635) of the locomotive consist 607, the controller 618 limited the predetermined braking power 640 to the stored recommended braking power 642, which is a braking power less than the maximum braking power (i.e. less than notch 8). As illustrated in FIG. 12, this scenario may occur when the locomotive consist 607 was traveling at a low speed less than the low speed threshold 634, where FIG. 11 illustrates that the braking effort exceeded the braking effort threshold at the maximum braking power. Thus, by limiting the predetermined braking power 640 corresponding to the maximum braking power to the lower recommended braking power 642, the controller 618 in-turn limits the braking effort to being within the predetermined range of the braking effort threshold, without exceeding the braking effort threshold. As discussed above, the stored recommended braking power in the respective memory 628,629 is based on the measured speed, when the measured speed exceeds the low speed threshold, and when the controller 618,620 adjusts the braking power of the respective engines (632,635) (637) to the recommended braking power, the braking effort approaches within the predetermined range 624 of the braking effort threshold 626 and does not exceed the braking effort threshold.

Figure 14:
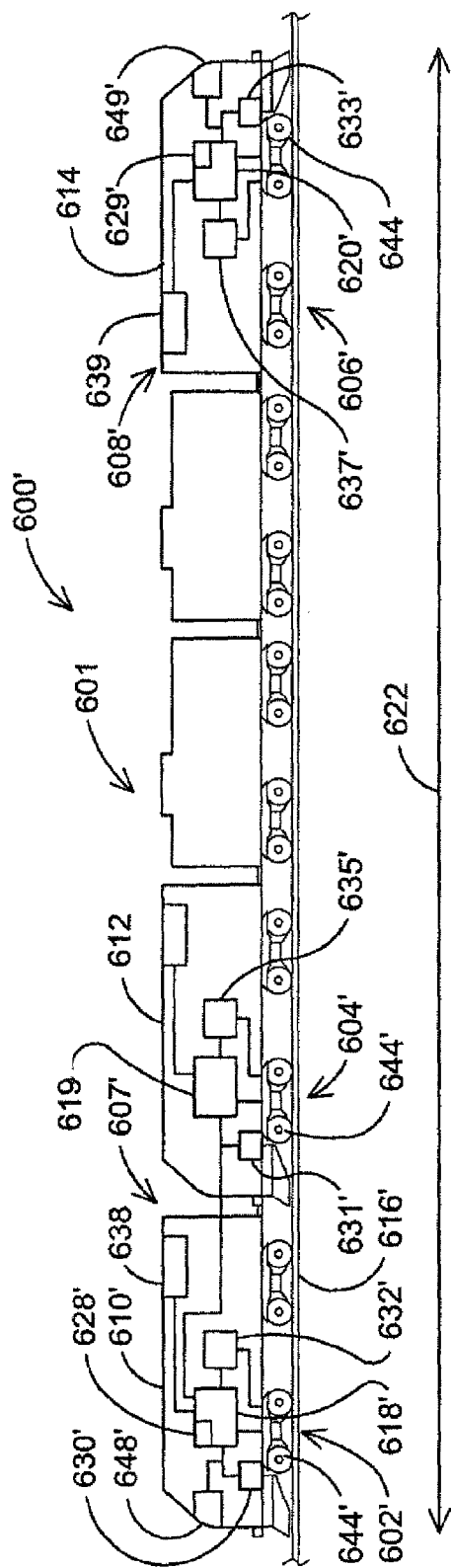
FIG. 14 is an exemplary embodiment of a control system for controlling a braking effort of a braking system in a powered system in accordance with the present invention.

In an additional embodiment of the present invention illustrated in FIG. 14, a system 600' includes controllers 618',620' of the respective locomotive consists 607',608', which also monitor braking effort of the braking system(s) (602',604') (606') at a braking region 622' along the route 616'. The controllers 618',620' subsequently compare the braking effort at the braking region 622' with the braking effort threshold. In FIGS. 10-13, the controllers 618',620' transmit a signal to a respective device 648',649' to annunciate to an operator of the locomotive consist 607',608' whether the braking effort has approached within the predetermined range of the braking effort threshold and/or exceeded the braking effort threshold. In an exemplary embodiment, the device 648',649' is a display, which illustrates an alert to the operator of the locomotive consist 607',608', and allows the operator to decide whether or not to limit the braking power in order to prevent the braking effort from exceeding the braking effort threshold. Thus, the device 648',649' may prompt the locomotive consist 607', 608' operator to perform a remedial action such that the braking approaches within the predetermined range of the braking effort threshold and does not exceed the braking effort threshold. In an exemplary embodiment, the device 648',649' may prompt the locomotive consist 607',608' operator with a recommended braking power, and thus the remedial action may involve manual variation of the braking power to the recommended braking power such that the braking effort approaches within the predetermined range of the braking effort threshold and does not exceed the braking effort threshold. Those elements of the system 600' not discussed herein, are similar to those elements previously discussed in regard to the embodiments of the system 600 of the present invention, without prime notation, and require no further discussion herein.

In an exemplary embodiment, the respective controller 618',620' may prompt the operator by transmitting an upper limit of the output power of the respective engines (632', 635') (637') to the device 648',649', such as a display, so that the braking effort threshold is not exceed. As previously discussed with regard to FIGS. 12-13, the braking effort varies with the speed of the locomotive consist 607,608. For example, the controller 618',620' may transmit an upper limit output power of notch level 5 to the device 648',649' when the locomotive consist 607',608' is traveling at speeds less than 25 miles per hour, but may transmit an upper limit output power of notch 8 to the device 648',649' when the locomotive consist 607',608' is traveling at speeds greater than 60 miles per hour, for example.

In an exemplary embodiment, in response to this communicated upper limit of the output power on the device 648',649', such as a display, the operator may input an output power (using a notch-level selector or other input means, for example), which is subsequently transmitted to the controller 618',620'. In an exemplary embodiment, once the operator of the locomotive consist 607',608' inputs an output power, the respective controller 618',620' compares this input braking power with the upper limit braking power, and only inputs the lesser of these two braking powers to the braking system (602',604') (606'), for the production of braking effort. As a result, the produced braking effort will not exceed the braking effort threshold. For example, if the upper limit of the braking power is determined to be 3000 horsepower, which corresponds to notch level 6, and the operator inputs a braking power of 4000 horsepower, which corresponds to notch level 7, the controller 618',620' will input the lesser of the two braking powers, i.e. notch 6, to the braking system (602',604') (606'), to ensure that the braking effort does not exceed the braking effort threshold.

In an exemplary embodiment, upon the operator having inputted an output power of the engines (632',635') (637'), the controller 618',620' may calculate the produced braking effort, based on data received from the sensors (630',631') (633'), such as a current passing through the traction motors, a voltage across the traction motors, and/or any electrical parameter related to the operation of the braking system (602',604') (606'). The respective memory 628',629' may have a stored look-up table of a produced braking effort based on the measured electrical parameters, for a particular locomotive consist configuration, for example. Once the controller 618',620' has calculated the actual produced braking effort, the controller 618',620' compares the actual produced braking effort with the braking effort threshold, and transmits an alert warning to the device 648',649' or display to warn the operator, if the actual produced braking effort approaches within the predetermined range of and/or exceeds the braking effort threshold.

In an exemplary embodiment, once the controller 618', 620' has communicated the alert warning to the device 648',649' or display to warn the operator that the actual produced braking effort has approached within the predetermined range of and/or exceeded the braking effort threshold, the controller 618',620' may receive a feedback braking power input from the operator. The controller 618',620' subsequently calculates the actual produced braking effort, based on the feedback power input provided by the operator.

The controller 618',620' calculates the actual produced braking-effort utilizing the data provided by the sensors (630', 631') (633'), such as the current passing through the traction motors and the voltage across the traction motors, for example. Upon determining the actual produced braking effort, the controller 618',620' compares the actual produced braking effort with the braking effort threshold, and if the actual produced braking effort is still within the predetermined range of and/or exceeds the braking effort threshold, the controller 618',620' switches into a limiting mode to subsequently limit the inputted output power from the operator to the upper limit output power discussed above, which corresponds to a maximum braking effort which does not exceed the braking effort threshold.

Figure 15:
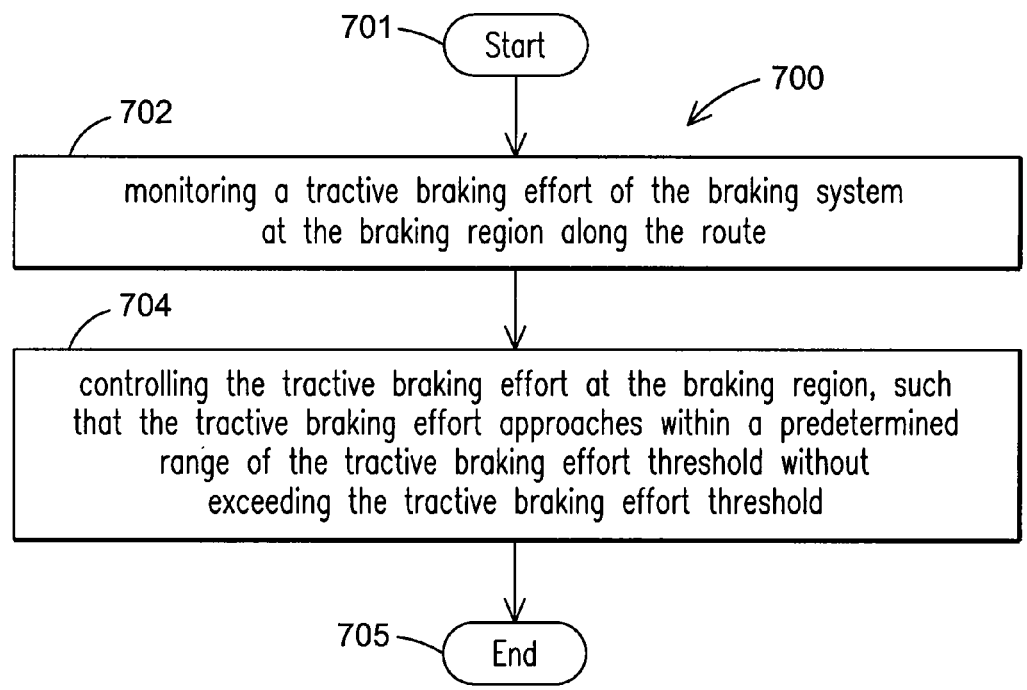
FIG. 15 is a flow chart of an exemplary embodiment of a method for controlling a braking effort of a braking system in a powered system.

FIG. 15 illustrates an exemplary embodiment of a method 700 for controlling the braking effort of the braking system (602,604) (606) in the locomotive consist 607,608. The method 700 begins at 701 by monitoring 702 a braking effort of the braking system (602,604) (606) at the braking region 622 along the route 616. The method 700 further includes controlling 704 the braking effort at the braking region 622, such that the braking effort approaches within a predetermined range 624 of the braking effort threshold 626 without exceeding the braking effort threshold 626, before ending at 705. For a single locomotive consist, the braking effort may be regulated based on the coordinates, terrain, tonnage and deceleration rate. In addition, it may be possible to vary the threshold to take into account the terrain (grade) and make it adjustable.

This written description uses examples to disclose embodiments of the invention, including the best mode, and also to enable any person skilled in the art to make and use the embodiments of the invention. The patentable scope of the embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control system configured to control a braking system in a powered system, the control system comprising:
   a controller configured to be coupled to the braking system and to monitor a braking effort of the braking system at a braking region along a route that the powered system travels, the controller being further configured to control the braking effort at the braking region, such that the braking effort approaches a braking effort threshold within a predetermined range and does not exceed the braking effort threshold;
   wherein the braking effort threshold is less than a current braking capacity of the braking system, the braking capacity being a braking capability of the braking system as the powered system is traveling along the route.

2. The control system of claim 1, wherein the powered system is one of an off-highway vehicle, a transport vehicle, or a rail vehicle.

3. The control system of claim 1, further comprising:
   a memory of the controller configured to store the braking effort threshold and the predetermined range; and
   a sensor coupled to the controller and configured to measure a parameter related to an operation of the powered system;

wherein the controller is configured to control the braking effort at the braking region, the braking effort being based upon the measured parameter.

4. The control system of claim 1, further comprising:
an engine coupled to the controller, the engine having an operating characteristic;
wherein the braking effort of the braking system at the braking region is based upon the operating characteristic of the engine; wherein upon the powered system having entered the braking region, said controller is configured to switch into a braking mode to selectively vary the operating characteristic of the engine such that the braking effort at the braking region approaches within the predetermined range of the braking effort threshold and does not exceed the braking effort threshold.

5. The control system of claim 4, further comprising:
a memory of the controller configured to store the braking effort threshold and the predetermined range;
a sensor coupled to the controller and configured to measure a parameter related to the operation of the powered system;
wherein the braking effort of the braking system at the braking region is further based upon the measured parameter; wherein upon the powered system having entered the braking region, the controller is configured to switch into the braking mode to selectively vary the operating characteristic of the engine based upon the measured parameter such that the braking effort at the braking region approaches within the predetermined range of the braking effort threshold and does not exceed the braking effort threshold.

6. The control system of claim 5, wherein the memory is configured to store an expected braking effort of the powered system based upon a respective parameter and a respective operating characteristic of the engine; and
wherein upon the powered system having entered the braking region, the controller is configured to monitor the braking effort based upon the measured parameter, the operating characteristic of the engine, and the expected braking effort retrieved from the memory.

7. The control system of claim 4, wherein the braking effort threshold and the predetermined range are based upon a characteristic of the powered system, the characteristic including at least one of a maximum operating characteristic of the engine, a weight of the powered system, a quantity of traction motors within the braking system, or a length of the powered system.

8. The control system of claim 5, wherein the sensor is a speed sensor configured to measure a speed of the powered system; the operating characteristic of the engine is a braking power; and upon switching into the braking mode, the controller is configured to selectively vary the braking power of the engine based upon the measured speed of the powered system.

9. The control system of claim 8, wherein the memory of the controller is configured to store a low speed threshold, the braking effort of the braking system at the braking region is based upon the measured speed, where the measured speed exceeds the low speed threshold;
the memory of the controller is further configured to store a recommended braking power based upon a respective speed of the powered system; wherein the braking effort of the powered system, traveling at the respective speed and with the recommended braking power, approaches within the predetermined range of the braking effort threshold and does not exceed the braking effort threshold; and
the controller is configured to retrieve the recommended braking power from the memory and vary the braking power of the engine to the recommended braking power.

10. The control system of claim 3, further comprising:
a position determination device coupled to the controller, the position determination device configured to provide location information of the powered system along the route to the controller;
the controller is configured to predetermine a braking power at incremental locations along the route prior to a commencement of a trip along the route, the predetermination of the braking power is configured to optimize a performance characteristic of the powered system during the trip along the route;
wherein as the powered system travels along the route, the controller is configured to receive the location information from the position determination device, and upon the powered system entering an incremental location corresponding to a braking region along the route, the controller is configured to limit the predetermined braking power to the recommended braking power based upon the measured parameter, such that the braking effort approaches within the predetermined range of the braking effort threshold and does not exceed the braking effort threshold.

11. The control system of claim 3, wherein the powered system is a locomotive consist within a train, the locomotive consist including a plurality of locomotives, said controller is positioned within a locomotive of the locomotive consist;
the memory of the controller is configured to store the braking effort threshold, the braking effort threshold is based upon a characteristic of the locomotive consist including at least one of a number of said plurality of locomotives within the locomotive consist, a number of respective traction motors within a respective locomotive of the plurality of locomotives, a respective maximum braking power of a respective engine of the plurality of locomotives, a respective weight of said plurality of locomotives and/or a respective length of the plurality of locomotives; and
the controller is coupled to a respective engine and braking system of the plurality of locomotives, the controller is configured to selectively vary the braking power of a respective engine of the plurality of locomotives based upon the the characteristic of the locomotive consist such that the braking effort of the locomotive consist at the braking region approaches within the predetermined range of the braking effort threshold and does not exceed the braking effort threshold of the locomotive consist.

12. The control system of claim 11, wherein the train comprises a plurality of locomotive consists; a respective controller is positioned within a respective locomotive consist and is configured to store a respective braking effort of the respective locomotive consist within the memory of the controller; the respective controller is configured to selectively vary the braking power of a respective engine of at least one locomotive within the respective locomotive consist based upon a measured speed of the locomotive consist such that the respective tractive effort of the respective locomotive consist approaches within the predetermined range of the braking effort threshold and does not exceed the braking effort threshold of the respective locomotive consist.

13. The control system of claim 1, wherein the predetermined range indicates that the braking effort is approaching a proximate value of the braking effort threshold.

14. The control system of claim 1, wherein the predetermined range is a fractional ratio of the braking effort threshold.

15. A method for controlling a braking system in a powered system traveling along a route, the method comprising:
   with a controller coupled to the braking system, monitoring a braking effort of the braking system at a braking region along the route; and
   controlling with the controller the braking effort at the braking region, such that the braking effort approaches the braking effort threshold within a predetermined range without exceeding the braking effort threshold;
   wherein the braking effort threshold is less than a current braking capacity, the current braking capacity being a braking capability of the braking system as the powered system is traveling along the route.

16. The method of claim 15, wherein the powered system is one of a one of an off-highway vehicle, a transport vehicle, or a rail vehicle.

17. The method of claim 15, further comprising:
   storing the braking effort threshold;
   measuring a parameter related to the operation of the powered system; and
   controlling the braking effort at the braking region based upon the measured parameter.

18. The method of claim 15, further comprising selectively varying an operating characteristic of an engine such that the braking effort at the braking region approaches within the predetermined range of the braking effort threshold without exceeding the braking effort threshold.

19. The method of claim 18, further comprising:
   storing the braking effort threshold;
   measuring a parameter related to the operation of the powered system; and
   selectively varying the operating characteristic of the engine based upon the measured parameter such that the braking effort at the braking region approaches within the predetermined range of the braking effort threshold without exceeding the braking effort threshold.

20. The method of claim 15, wherein the predetermined range indicates that the braking effort is approaching a proximate value of the braking effort threshold.

21. The method of claim 15, wherein the predetermined range is a fractional ratio of the braking effort threshold.

* * * * *